US012703391B2

(12) United States Patent
Zhu et al.

(10) Patent No.: US 12,703,391 B2
(45) Date of Patent: Aug. 11, 2026

(54) SYSTEMS AND METHODS FOR EVALUATING OBJECT TRACKING METHODOLOGIES

(71) Applicant: Torc Robotics, Inc., Blacksburg, VA (US)

(72) Inventors: Zhenghan Zhu, Austin, TX (US); Jackson Maury Newton, Christiansburg, VA (US); Haseeb Chaudhry, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 7 days.

(21) Appl. No.: 18/905,833

(22) Filed: Oct. 3, 2024

(65) Prior Publication Data

US 2026/0097784 A1 Apr. 9, 2026

(51) Int. Cl.
*B60W 60/00* (2020.01)
*G06F 17/18* (2006.01)

(52) U.S. Cl.
CPC ........... *B60W 60/001* (2020.02); *G06F 17/18* (2013.01)

(58) Field of Classification Search
CPC ............................. B60W 60/001; G06F 17/18
See application file for complete search history.

(56) References Cited

U.S. PATENT DOCUMENTS 9,720,415 B2 8/2017 Levinson et al.
10,048,683 B2 8/2018 Levinson et al.
10,395,444 B1 8/2019 Edren et al.
10,509,413 B2 12/2019 Mou
10,902,615 B2 1/2021 Tao et al.
11,062,141 B2 7/2021 Choi
11,420,648 B2 8/2022 Djuric et al.
11,675,366 B2 6/2023 Galoogahi et al.
11,842,530 B2 12/2023 Casas et al.
11,960,290 B2 4/2024 Laddha et al.
11,967,106 B2 4/2024 Galoogahi et al.
2019/0180134 A1* 6/2019 Myeong .................... G06T 7/74
2019/0204114 A1* 7/2019 Berntorp ............. B60R 16/0231
2020/0023846 A1* 1/2020 Husain .................... H04W 4/44
2020/0081441 A1* 3/2020 Kizumi ................ G05D 1/0212
(Continued)

*Primary Examiner* — Scott A Browne
*Assistant Examiner* — Rami Nabih Bedewi
(74) *Attorney, Agent, or Firm* — Armstrong Teasdale LLP

(57) ABSTRACT

An autonomous vehicle including one or more sensors, at least one processor, and at least one memory storing instructions, which, when executed by the at least one processor, cause the at least one processor to perform operations including receiving sensor data from one or more sensors of an autonomous vehicle, determining, using a first tracking methodology, methodology tracking based on the sensor data, and receiving ground truth tracking. The at least one processor determining an association between the methodology tracking and the ground truth tracking, determining a joint probability distribution of the methodology tracking and the ground truth tracking, determining a methodology tracking distribution based on the joint probability distribution, determining a ground truth tracking distribution based on the joint probability distribution, and determining a Kullback-Leibler Divergence (KLD) score between the methodology tracking distribution and the ground truth tracking distribution.

18 Claims, 6 Drawing Sheets

(56) References Cited

U.S. PATENT DOCUMENTS

2020/0363810 A1* 11/2020 Arras ................. G01C 21/3453
2020/0380274 A1 12/2020 Shin et al.
2021/0312248 A1 10/2021 Tchuiev et al.
2022/0153309 A1 5/2022 Cui et al.
2022/0153314 A1 5/2022 Suo et al.
2022/0262129 A1* 8/2022 Cao ....................... G01S 13/931
2023/0049221 A1* 2/2023 Rout ................... G06F 16/2457
2023/0054759 A1 2/2023 Robinson et al.
2023/0091986 A1 3/2023 Gyllenhammar et al.
2023/0314599 A1 10/2023 Jia et al.
2023/0406345 A1* 12/2023 Wu ................. B60W 30/18163
2023/0419080 A1 12/2023 Choi et al.
2024/0037367 A1* 2/2024 Lambert ................ G06N 3/006
2025/0166352 A1* 5/2025 Emad Marvasti ........ G06T 7/70

* cited by examiner

SYSTEMS AND METHODS FOR EVALUATING OBJECT TRACKING METHODOLOGIES

TECHNICAL FIELD

The field of the disclosure relates generally to systems and methods for evaluating tracking methodologies and, more specifically, systems and methods for evaluating tracking methodologies for use with automatic and semi-automatic vehicle controls.

BACKGROUND OF THE INVENTION

Object tracking is needed for supporting autonomous vehicles which rely on the perception of their surroundings to determine robust controlling instructions. As such, a variety of object tracking methodologies have been developed to determine tracking parameters, e.g., heading, acceleration, velocity, etc., of a plurality of actors, e.g., other vehicles or pedestrians, surrounding an autonomous vehicle or ego. These tracking methodologies may be executed, in real-time, during navigation of an autonomous vehicle to determine controls to be executed by the autonomous vehicle, e.g., to avoid collisions with the actors. As such, the accuracy of these tracking methodologies need to be evaluated in order to control the operation of the autonomous vehicle. Various evaluation techniques have been used to evaluate the error in tracking methodologies, such as determining errors for each of the plurality of tracking parameters for each actor for multiple time increments. These multiple errors scores may make it difficult to quickly or easily compare across multiple tracking methodologies.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, the disclosed autonomous vehicle includes one or more sensors, at least one processor, and at least one memory storing instructions, which, when executed by the at least one processor, cause the at least one processor to perform operations including receive sensor data from one or more sensors of an autonomous vehicle, determine methodology tracking for a plurality of parameters for at least one actor, using the sensor data and a first tracking methodology, and receiving ground truth tracking. The processor further performs operations including determine an association between the methodology tracking and the ground truth tracking, determine a joint probability distribution of the association, determine a methodology tracking distribution based on the joint probability distribution, and determine a ground truth tracking distribution based on the joint probability distribution. The processor further performs operations including determine a Kullback-Leibler Divergence (KLD) score between the methodology tracking distribution and the ground truth tracking distribution and control operation of the autonomous vehicle based on the KLD score.

In another aspect, the disclosed computer implemented method includes receiving sensor data from one or more sensors of an autonomous vehicle and determining methodology tracking for a plurality of parameters for at least one actor, using the sensor data and a first tracking methodology. The method includes receiving ground truth tracking, determining an association between the methodology tracking and the ground truth tracking, and determining a joint probability distribution of the association. The method includes determining a methodology tracking distribution based on the joint probability distribution, determining a ground truth tracking distribution based on the joint probability distribution, and determining a Kullback-Leibler Divergence (KLD) score between the methodology tracking distribution and the ground truth tracking distribution. The method includes controlling operation of the autonomous vehicle based on the KLD score.

In yet another aspect, the disclosed non-transitory computer-readable medium embodying programmed instructions which, when executed by at least one processor of an autonomous vehicle, cause the at least one processor to perform operations including receiving sensor data from one or more sensors of an autonomous vehicle, determining methodology tracking for a plurality of parameters for at least one actor, using the sensor data and a first tracking methodology, and receiving ground truth tracking. The at least one processor further performs operations including determining an association between the methodology tracking and the ground truth tracking, determining a joint probability distribution of the association, and determining a methodology tracking distribution based on the joint probability distribution. The at least one processor further performs operations including determining a ground truth tracking distribution based on the joint probability distribution, determining a Kullback-Leibler Divergence (KLD) score between the methodology tracking distribution and the ground truth tracking distribution, and controlling operation of the autonomous vehicle based on the KLD score.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRA WINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
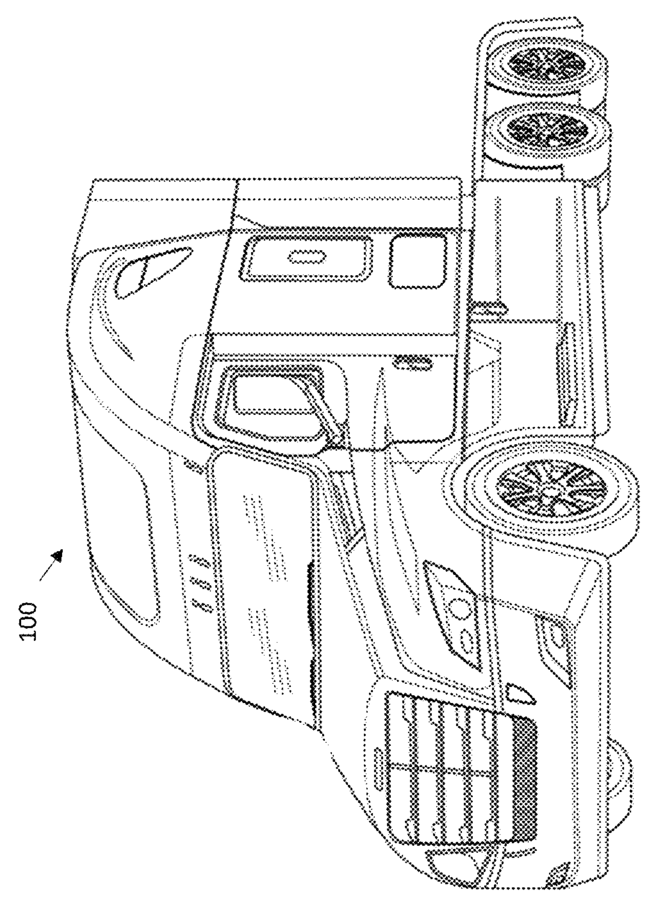
FIG. 1 is a schematic diagram of an autonomous vehicle.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing. The drawings are not to scale unless otherwise noted.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

The disclosed systems and methods are described, for clarity, using certain terminology when referring to and describing relevant components within the disclosure. Where possible, common industry terminology is employed in a manner consistent with its accepted meaning. Unless otherwise stated, such terminology should be given a broad interpretation consistent with the context of the present application and the scope of the appended claims.

In embodiments described herein, tracking methodologies are compared relative to a ground truth, by determining one single statistic score, such as a Kullback-Leibler divergence (KLD) score. The single KLD score may be used to compare a plurality of different tracking methodologies with an increased speed and efficiency. Based on the comparison, an optimal tracking methodology may be selected for use during autonomous vehicle operations. For example, the single KLD score may be compared, e.g., with improved computational efficiency, to another single KLD score obtained from another evaluation of another tracking methodology. In some embodiments, the single score may be used during development or training of a tracking methodology. For example, during a training process, training variables may each be associated with a weighting factor, wherein adjustment of the weighting factor adjusts the influence of the variable during training. The single KLD score may be used to evaluate adjustments to the weighting factors during development of a tracking methodology.

In embodiments described herein, the single KLD score, may be particularly advantageous over other known methodologies, as only a single score is determined. For example, other known evaluation methods determine a plurality of evaluation parameters, e.g., squared errors for each parameter in the tracking methodology, such as an error for object identification, an error for position of an object, an error for object velocity, an error for acceleration, and/or in some cases, each of the individual errors may include a plurality of errors spanning across a plurality of time increments. A plurality of evaluation parameters does not facilitate evaluation of overall performance and/or readily available selection among a plurality tracking methodologies based on the overall performance. In embodiments described herein, the single KLD score is representative of all the tracking parameters for a plurality of time increments. Systems and methods described herein are advantageous in determining a single score for evaluating performance of a tracking methodology without significant increase to computation loads, thereby enabling implementation of the systems and methods online. As used herein, being online refers to a system or method is implemented on an autonomous vehicle and operates while the autonomous vehicle is operating.

An autonomous vehicle is described as an example for illustration purposes only. Systems and methods described herein may be applied to a semi-autonomous vehicle or a vehicle with a level of automation.

Figure 2:
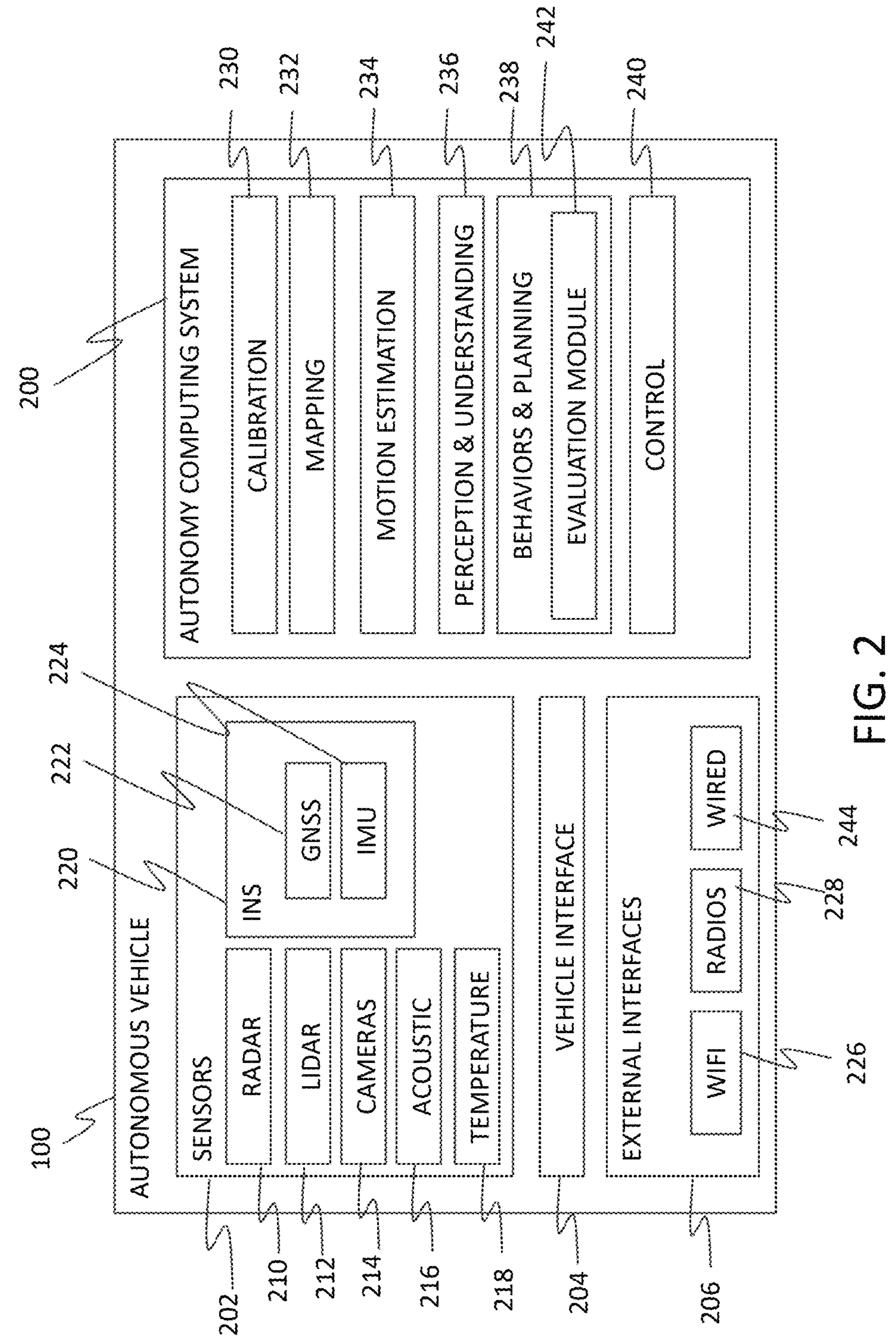
FIG. 2 is a block diagram of an autonomous vehicle.

FIG. 1 is a schematic diagram of an autonomous vehicle 100. FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 120 to determine how to control operation of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be stitched or combined to generate a visual representation of the multiple cameras' FOVs, which may be used to, for example, generate a bird's eye view of the environment surrounding autonomous vehicle 100. In some embodiments, the image data generated by cameras 214 may be sent to autonomy computing system 200 or other aspects of autonomous vehicle 100, and this image data may include autonomous vehicle 100 or a generated representation of autonomous vehicle 100. In some embodiments, one or more systems or components of autonomy computing system 200 may overlay labels to the features depicted in the image data, such as on a raster layer or other semantic layer of a high-definition (HD) map.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. Radar sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw radar sensor data) from the emitted radio waves. In some embodiments, the system inputs from cameras 214, radar sensors 210, or LiDAR sensors 212 may be fused or used in combination to determine conditions (e.g., locations of other objects) around autonomous vehicle 100.

GNSS receiver 222 is positioned on autonomous vehicle 100 and may be configured to determine a location of autonomous vehicle 100, which it may embody as GNSS data, as described herein. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, and or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc. referred to generally as a state of actor) of autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5g, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically, or manually) via external interfaces 206 or updated on demand. In some embodiments, autonomous vehicle 100 may deploy with all of the data it needs to complete a mission (e.g., perception, localization, and mission planning) and may not utilize a wireless connection or other connection while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and tracking evaluation module 242. Tracking evaluation module 242, for example, may be embodied within another module, such as behaviors and planning module 238, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

The tracking evaluation module 242 may be used to evaluate one or more tracking methodologies by comparing the tracking methodologies to a ground truth. The tracking evaluation module 242 determines one single statistic score, including the Kullback-Leibler divergence (KLD) score. The tracking evaluation module 242 may compare KLD scores for different tracking methodologies to select a suitable tracking methodology from a plurality of different tracking methodologies.

Autonomy computing system 200 of autonomous vehicle 100 may be completely autonomous (fully autonomous) or semi-autonomous. In one example, autonomy computing system 200 can operate under Level 5 autonomy (e.g., full driving automation), Level 4 autonomy (e.g., high driving automation), or Level 3 autonomy (e.g., conditional driving automation), or Level 2 autonomy (e.g., partial driving automation). As used herein the term “autonomous” includes both fully autonomous and semi-autonomous.

Figure 3:
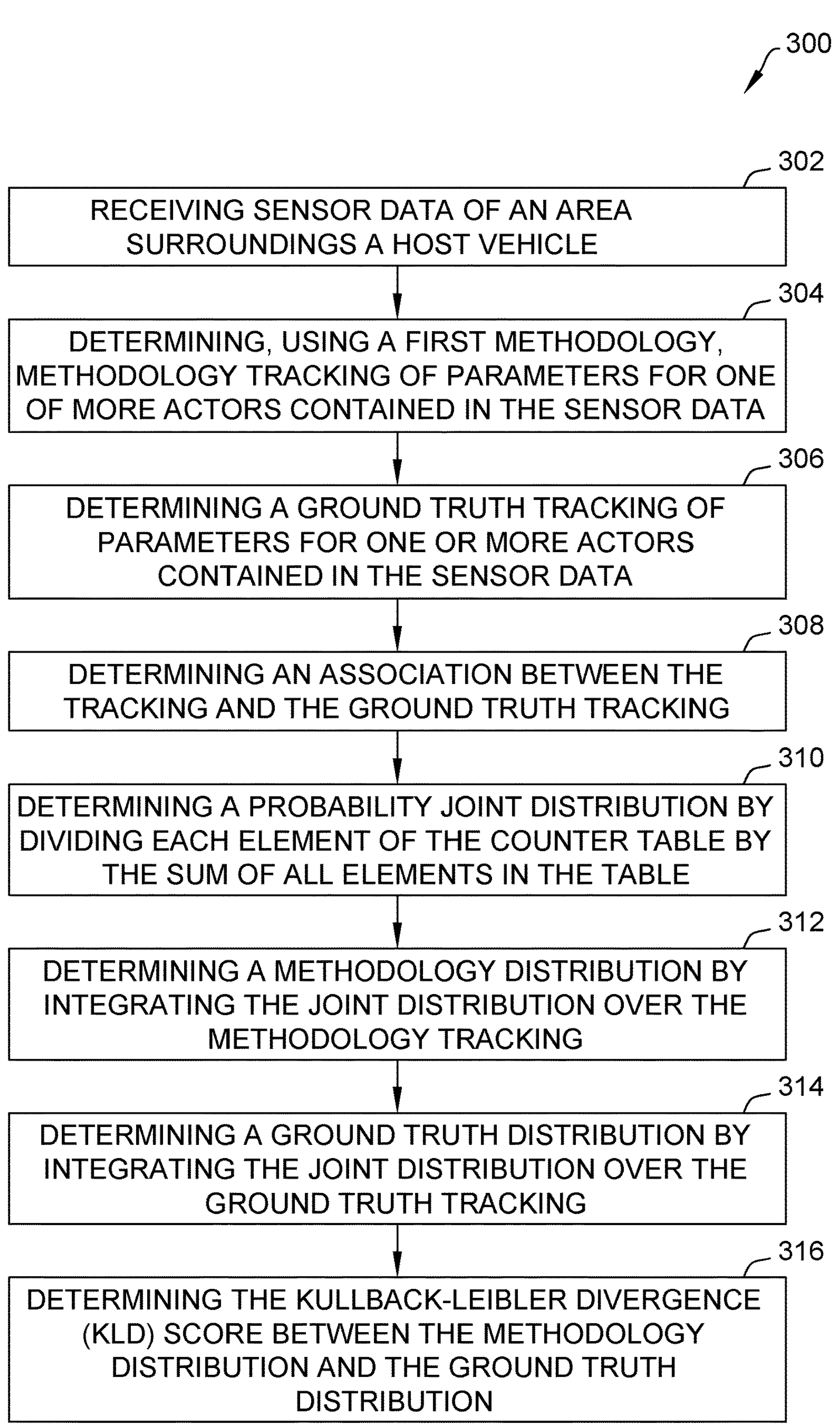
FIG. 3 is a flowchart of a method of evaluating a tracking methodology for use with autonomous vehicle navigation.

FIG. 3 is a flowchart of a method 300 of evaluating a tracking methodology for use for controlling operation of autonomous vehicle 100, by determining a KLD score. The method 300 may be implemented by evaluation module 242, autonomy computing system 200 and/or using one or more processors and one or more memory devices, as described above with respect to FIG. 2. In some embodiments, evaluation module 242 may be separate from autonomy computing system 200 and in communication with autonomy computing system 200 in controlling operation of autonomous vehicle 100.

Method 300 includes detecting, using sensors 202, sensor data (e.g., image data, LiDAR data, etc.) of an area surrounding a vehicle, e.g., autonomous vehicle 100. Method 300 includes receiving 302, or retrieving, sensor data of an area surrounding the vehicle, collected from sensors 202. Method 300 includes determining 304, using a first tracking methodology and the sensor data, tracking parameters (e.g., object identification, position, heading, velocity, acceleration, etc.) for one or more actors in the area surrounding vehicle 100. Actors may include, for example, and without limitation, other vehicles, persons, or objects in the area surrounding the ego.

In some alternative embodiments, method 300 includes determining the tracking parameters using a plurality of different tracking methodologies (e.g., a second tracking methodology, a third tracking methodology, etc.).

Generally, tracking parameters include one or more of the following parameters, for example and without limitation, object type a, heading, position$_a$ ($p_a$), velocity$_a$ ($v_a$), acceleration$_a$ ($a_a$), object type b, heading, $p_b$, $v_b$, $a_b$, . . . object type n, heading, $p_n$, $v_n$, $a_n$, etc., for each actor. Evaluation module 242 may determine 304 methodology tracking, using the first tracking methodology, for each parameter, for each actor, for a plurality of steps (e.g., $t_1$, $t_2$, . . . $t_n$), such as time increments or data collection increments. As used herein, methodology tracking refers to actors and corresponding tracking parameters determined using a tracking methodology that is being evaluated. For example, sensors 202 may collect data at any suitable data collection rate, e.g., LiDAR sensor data collection rate of 20-100 Mbps, camera collection rate of 500-3500 Mpbs, etc., and evaluation module 242 determines, using the first tracking methodology, methodology tracking, for each actor, for each instance of data collected by the sensors 202. As such, tracking parameters may include, for example for a first actor, for each step, an object type$_{a,t1}$, heading$_{a,t1}$, $p_{a,t1}$, $v_{a,t1}$, $a_{a,t1}$, object type$_{a,t2}$, heading$_{t2}$, $p_{a,t2}$, $v_{a,t2}$, $a_{a,t2}$, . . . object type$_{a,tn}$, heading$_{a,tn}$, $p_{a,tn}$, $v_{a,tn}$, $a_{a,tn}$.

In some embodiments, method 300 includes evaluation module 242 determining 306 ground truth tracking, using at least one of a ground truth tracking system, e.g., using a manual process (e.g., performed by a human), and/or a combination of an automated process and a manual process thereof. As used herein, ground truth tracking refers to actors and corresponding tracking parameters determined using a ground truth tracking system. In some embodiments described herein, the ground truth tracking system may be more computationally expensive, as compared to the first tracking methodology. In some embodiments, method 300 includes obtaining the ground truth tracking from another computer device associated with a manual tracking system service. In other embodiments, determining 306 the ground truth may be determined using any suitable methodology or obtained from any suitable source. In some embodiments, the ground truth tracking system may be used to determine tracking parameters that may be assumed to be, or is confirmed to be, e.g., using a manual verification process, representative of true or actual values of tracking parameters for actors. Ground truth tracking may include, for example for a first actor a, for each step, an object type$_{gt\text{-}a,t1}$, heading$_{gt\text{-}a,t1}$, $p_{gt\text{-}a,t1}$, $v_{gt\text{-}a,t1}$, $a_{gt\text{-}a,t1}$, object type$_{gt\text{-}a,t2}$, heading$_{gt\text{-}a,t2}$, $p_{gt\text{-}a,t2}$, $v_{gt\text{-}a,t2}$, $a_{gt\text{-}a,t2}$, . . . , object type$_{gt\text{-}a,tn}$, heading$_{gt\text{-}a,tn}$, $p_{gt\text{-}a,tn}$, $v_{gt\text{-}a,tn}$, $a_{gt\text{-}a,tn}$ etc.

In some embodiments, method 300 includes transmitting sensor data to another service computing system associated with a ground truth tracking system and the ground truth tracking system may determine the ground truth tracking. After the ground truth tracking system has determined ground truth tracking, the method 300 includes receiving, or retrieving, the ground truth tracking from the service computer device.

Method 300 includes determining 308 an association between the ground truth tracking and the methodology tracking. Determining 308 the association may include generating a mapping that pairs individual parameters of the ground truth tracking with corresponding, if available, individual parameters of the methodology tracking. Association may be determined based on a similarity metric between the ground truth tracking and the methodology tracking at a certain instance in evaluating the tracking parameters of actors by a methodology. For example, at a time instance $t_1$, a similarity metric between a set of tracking parameters for a first actor determined by a methodology and a set of tracking parameters for a second actor determined by the ground truth tracking system is determined. If the similarity metric is below a threshold level, the first actor determined by the methodology is associated with the second actor determined by the ground truth tracking system. Example similarity metrics may be Hungarian based or Manhattan distance based. Corresponding or associated methodology tracking may not be available in the case that the ground truth tracking system may identify an actor that was not detected in the methodology tracking. In some embodiments, determining 308 an association between the ground truth tracking and the methodology parameters tracking may include generating an association table that counts the number of times that the methodology tracking matches the ground truth tracking, for each parameter, for each step, for each actor. Determining 308 may be performed over a period of time, where the number of times that actors tracked by a methodology match or associate with actors tracked by the ground truth tracking system is accumulated over the period of time.

Method 300 includes autonomy computing system 200 determining 310 a joint probability distribution for the determined association, e.g., determined in determining 308. In some embodiments, determining 310 the joint probability distribution includes dividing a sum corresponding to an instance of a methodology tracking being associated with a ground truth tracking for a sampling period by the sum of all instances of methodology tracking being associated with ground truth tracking for the sampling period.

For example, for a sampling period of 10 s, method tracking and ground truth tracking are sampled at an interval of 10 ms. At every 10 ms, methodology tracking and ground truth tracking are determined, and the number of instances that a specific methodology tracking is associated with a specific ground truth tracking is recorded. The association may be recorded in an association table. At the end of the sampling period, the number of times the specific methodology tracking associated with the specific ground truth tracking in the period of 10 s has been accumulated over the period. A total number of all instances that any methodology tracking associated with any ground truth tracking is determined by summing all instances that a methodology tracking is associated with a ground truth tracking during the total period of 10 s. The joint probability distribution of the specific methodology tracking and the specific ground truth tracking is determined by dividing the number of the specific methodology tracking being associated with the specific ground truth over the period of 10 s by the total sum of all instances of association over the period of 10 s. Following the example of an association table, at the end of the period of 10 s, a specific element in the final association table indicates the numbers of times a corresponding specific methodology tracking associated with a corresponding specific ground truth tracking over the period of 10 s. The joint probability distribution for a specific methodology tracking and a specific ground truth tracking is determined by dividing the element in the final association table corresponding to the specific methodology tracking and the specific ground truth tracking by the sum of all elements in the final association table.

Method 300 includes autonomy computing system 200 determining 312 a marginal probability distribution or a methodology distribution associated with the methodology tracking for a specific methodology. Determining 312 includes integrating the joint distribution over the ground truth tracking. For example, following the example of an association table, a methodology distribution is determined by adding the joint probability distribution of all ground truth tracking in the final association table.

Method 300 includes determining 314 a marginal probability distribution or a ground truth distribution associated with the ground truth tracking. Determining 314 includes integrating the joint probability distribution over the methodology tracking. For example, following the example of an association table, a ground truth distribution is determined by adding the joint probability distribution of all methodology tracking in the final association table.

Method 300 includes determining 316 the Kullback-Leibler Divergence (KLD) score between the methodology distribution and the ground truth tracking distribution. For example, determines $$KLD(\text{Methodology Tracking Distribution} \| \text{Ground Truth Tracking Distribution}) = \sum_{x \in X} \text{Methodology Tracking Distibution}(x) \log \frac{\text{Methodogy Tracking Distibution}(x)}{\text{Ground Truth Tracking Distribution}(x)}.$$

In some embodiments, x may be the tracking that is identified and X may be a set of all aggregated tracking identified in the evaluation. The KLD score is in the range of being equal to or greater than zero.

In some embodiments, method 300 includes transmitting the KLD score to vehicle controller, e.g., autonomy computing system 200, such that vehicle controller may execute the first methodology to determine tracking parameters of actors in the vicinity of the vehicle 100.

Figure 4:
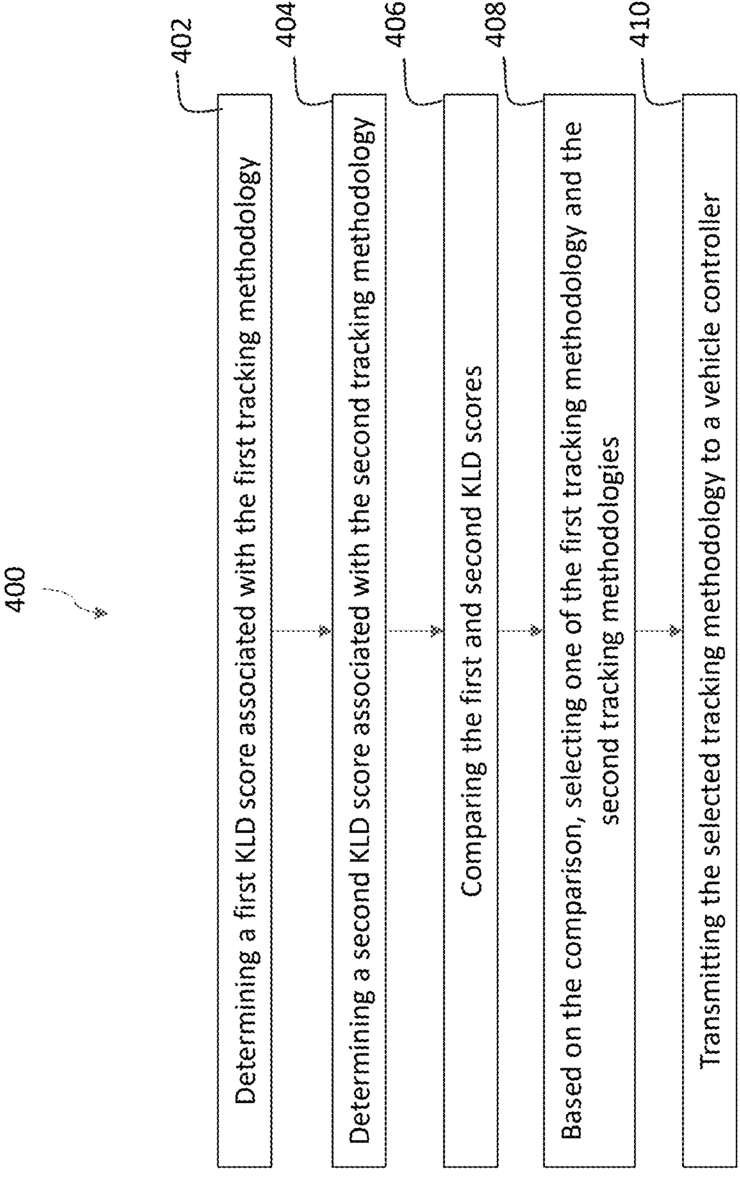
FIG. 4 is a flowchart of a method of selecting a tracking methodology for use with autonomous vehicle navigation.

FIG. 4 is a flowchart of a method 400 of selecting a tracking methodology for use with autonomous vehicle navigation. The method 400 may be implemented by evaluation module 242, autonomy computing system 200 and/or using one or more processors and one or more memory devices, as described above with respect to FIG. 2. Method 400 includes determining 402 a first KLD score for a first tracking methodology and determining 404 a second KLD score for a second tracking methodology. In some embodiments, determining 402 the first KLD score and determining 404 the second KLD score may include using method 300 described with respect to FIG. 3. In alternative embodiments, method 400 includes obtaining the first and second KLD scores indirectly, e.g., from another computing device.

Method 400 includes comparing 406 the first KLD score to the second KLD score, e.g., to rank the first and second tracking methodologies. For example, tracking methodologies having a higher KLD score are ranked higher, compared to tracking methodologies having lower KLD scores. In some embodiments, method 400 includes selecting 408 a tracking methodology for use in autonomous vehicle navigation based on the comparison 406, e.g., the tracking methodology with the highest KLD score.

In some embodiments, method 400 includes comparing the KLD score to a criterion, and selecting a tracking methodology if the KLD score satisfies the criterion. For example, method 400 includes comparing KLD scores to a threshold KLD score, and then method 400 includes selecting a tracking methodology if the KLD score of the tracking methodology is at least the threshold KLD score.

Method 400 may include transmitting 410 the selected tracking methodology to a vehicle controller to be executed by the vehicle controller during navigation of the autonomous vehicle 100.

In some embodiments, tracking methodologies may also be associated with a computational efficiency, e.g., in some embodiments, tracking methodologies may each have a computational time and/or computational cost, and method 400 may include selecting a tracking methodology from a plurality of tracking methodologies based on the KLD score as well as the computational efficiency.

Figure 5:
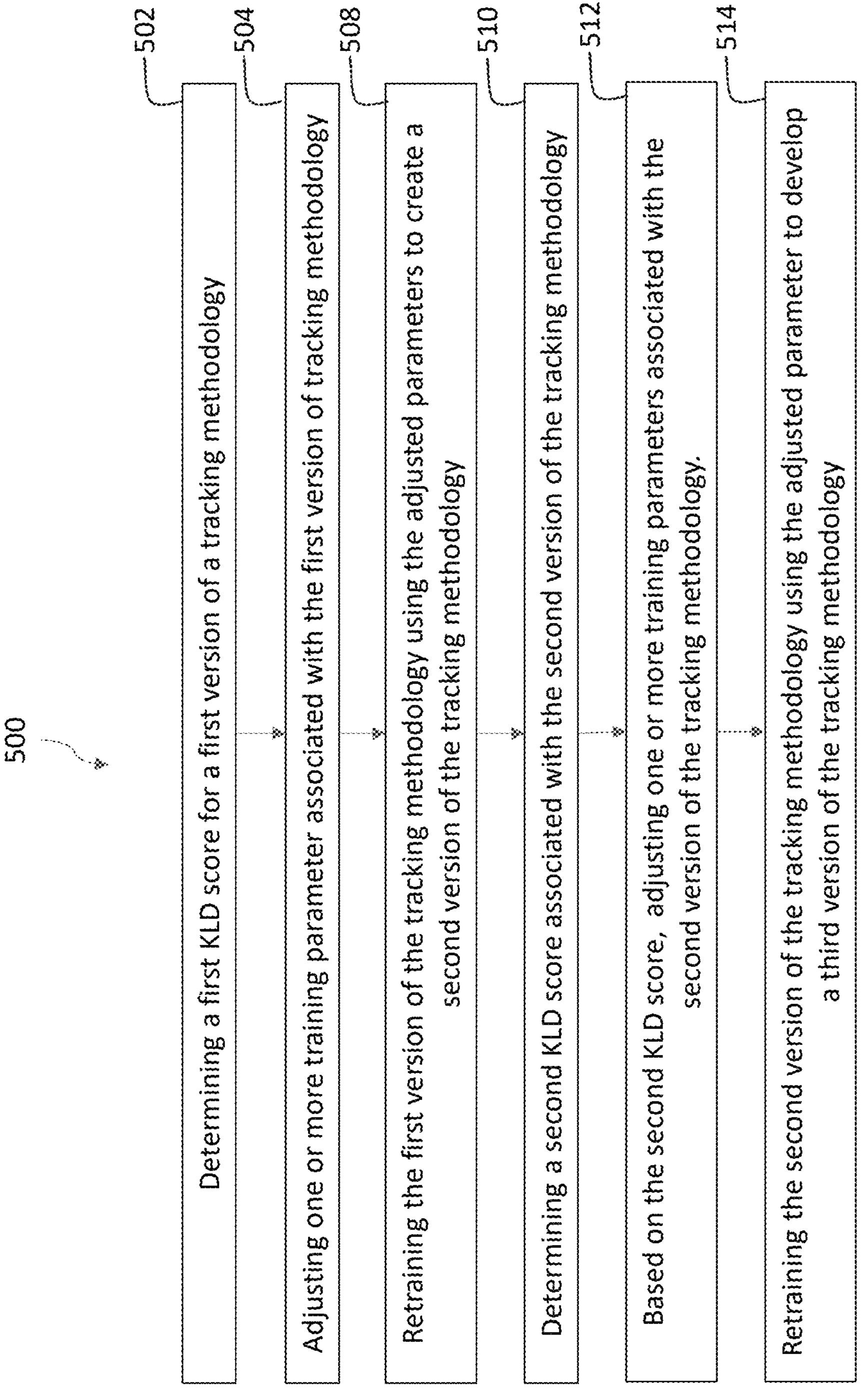
FIG. 5 is a flowchart of a method of developing a tracking methodology for use with autonomous vehicle navigation.

FIG. 5 is a flowchart of a method 500 of developing, e.g., optimizing, training, or tuning, a tracking methodology for use with autonomous vehicle navigation. For example, a tracking methodology is optimized by adjusting parameters and/or algorithms used in the methodology to optimize, reduce, or minimize the KLD score. Method 500 includes determining a first KLD score for a first version of a tracking methodology. In some embodiments, determining 502 the first KLD score may include determining the KLD scores using method 300 described with respect to FIG. 3. Method 500 includes adjusting 504 the first version of the tracking methodology, such as adjusting parameters or algorithm used in the tracking methodology. In some embodiments, the tracking methodology is associated with a model, which may be trained, or tuned, using training parameters, e.g., historical training data, weighting factors, etc. Adjusting 504 the one or more training parameters may include evaluation module 242 adjusting, e.g., increasing or decreasing, a weighting factor associated with training data or additionally or alternatively, adjusting training parameters may include changing, e.g., removing or adding, historical training data from the training dataset.

Method 500 includes retraining 508 the first version of the tracking methodology using the adjusted parameters to create a second version of the tracking methodology. Method 500 includes determining 510 a second KLD score associated with the second version of the tracking methodology. In some embodiments, determining the second KLD scores may include determining the KLD scores using method 300 described with respect to FIG. 3.

Based on the second KLD score, method 500 includes adjusting 512 the one or more training parameters associated with the second version of the tracking methodology. In some embodiments, adjusting 512 includes comparing the first KLD score to the second KLD score to determine how to adjust 512 the one or more training parameters. For example, based on the difference between first KLD and second KLD scores, determines whether to increase or decrease weighting factors and/or additionally, how much to increase or decrease the weighting factors.

After the training parameters have been adjusted, method 500 includes retraining 514 the second version of the tracking methodology using the adjusted parameters to develop a third version of the tracking methodology. In embodiments described herein, method 500 may be iteratively repeated to improve, e.g., increase the KLD score, of the tracking methodology. In some embodiments, method 500 may be repeated until a determined KLD score satisfies a criterion and/or until the tracking methodology is optimized, e.g., having an optimal KLD score, or an optimal KLD score for a computational efficiency of the tracking methodology.

Figure 6:
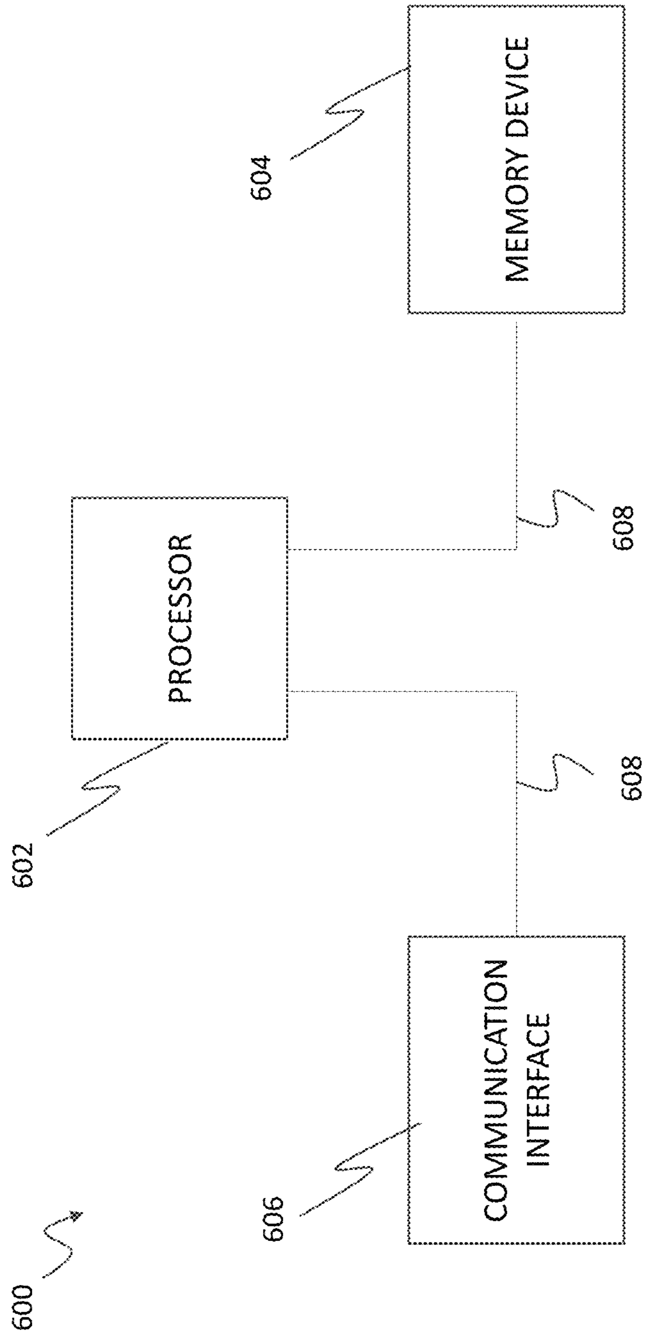
FIG. 6 is a block diagram of an example computing device.

FIG. 6 is a block diagram of an example computing device 600. Autonomy computing system 200 may include one or more computing device 600. Methods, 300, 400, 500 or parts of methods 300, 400, 500 may be implemented with one or more computing device 600. Computing device 600 includes a processor 602 and a memory device 604. The processor 602 is coupled to the memory device 604 via a system bus 608. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition or meaning of the term "processor."

In the example embodiment, the memory device 604 includes one or more devices that enable information, such as executable instructions or other data (e.g., sensor data), to be stored and retrieved. Moreover, the memory device 604 includes one or more computer readable media, such as, without limitation, dynamic random access memory (DRAM), static random access memory (SRAM), a solid state disk, or a hard disk. In the example embodiment, the memory device 604 stores, without limitation, application source code, application object code, configuration data, additional input events, application states, assertion statements, validation results, or any other type of data. The computing device 600, in the example embodiment, may also include a communication interface 606 that is coupled to the processor 602 via system bus 608. Moreover, the communication interface 606 is communicatively coupled to data acquisition devices.

In the example embodiment, processor 602 may be programmed by encoding an operation using one or more executable instructions and providing the executable instructions in the memory device 604. In the example embodiment, the processor 602 is programmed to select a plurality of measurements that are received from data acquisition devices.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

An example technical effect of the methods, systems, and apparatus described herein includes at least one of: (a) evaluating tracking methodologies relative to a ground truth system (b) determining distributions of methodology tracking and ground truth tracking, (c) determining a single KLD score for tracking methodologies, or (d) comparing the single KLD score of a first tracking methodology to a single KLD score of another tracking methodology in order to make a selection of which tracking methodology to be executed by a vehicle controller.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. An autonomous vehicle comprising:
one or more sensors;
at least one processor; and
at least one memory storing instructions, which, when executed by the at least one processor, cause the at least one processor to perform operations comprising:
receiving sensor data from the one or more sensors of the autonomous vehicle;
determining, using a first tracking methodology, methodology tracking based on the sensor data;
receiving ground truth tracking;
determining an association between the methodology tracking and the ground truth tracking, determining the association further comprising generating an association table that counts a number of times that the methodology tracking is associated with the ground truth tracking;
determining a joint probability distribution of the methodology tracking and the ground truth tracking;
determining a methodology tracking distribution based on the joint probability distribution;
determining a ground truth tracking distribution based on the joint probability distribution;
determining a Kullback-Leibler Divergence (KLD) score between the methodology tracking distribution and the ground truth tracking distribution; and
controlling operation of the autonomous vehicle based on the KLD score.

2. The autonomous vehicle of claim 1, wherein the methodology tracking includes the first tracking methodology and a second tracking methodology and wherein the KLD score includes a first KLD score and a second KLD score, and wherein the at least one memory storing instructions, which, when executed by the at least one processor, cause the at least one processor to perform operations comprising:
determining the first KLD score for the first tracking methodology;
determining the second KLD score for the second tracking methodology;
comparing the first KLD score and the second KLD score; and
based on the comparison, selecting between the first tracking methodology and the second tracking methodology implemented on the autonomous vehicle.

3. The autonomous vehicle of claim 1, wherein the at least one memory storing instructions, which, when executed by the at least one processor, cause the at least one processor to perform operations comprising:
optimizing the methodology by optimizing the KLD score.

4. The autonomous vehicle of claim 1, wherein the at least one memory storing instructions, which, when executed by the at least one processor, cause the at least one processor to perform operations comprising:
determining the association by:
computing a similarity metric between the methodology tracking and the ground truth tracking; and
comparing the similarity metric with a threshold.

5. The autonomous vehicle of claim 1, wherein determining the methodology tracking distribution comprises integrating the joint probability distribution over the ground truth tracking.

6. The autonomous vehicle of claim 1, wherein determining the ground truth tracking distribution comprises integrating the joint probability distribution over the methodology tracking.

7. A computer implemented method comprising:
receiving sensor data from one or more sensors of an autonomous vehicle;
determining, using a first tracking methodology, methodology tracking based on the sensor data;
receiving ground truth tracking;
determining an association between the methodology tracking and the ground truth tracking;
determining a joint probability distribution of the methodology tracking and the ground truth tracking;
determining a methodology tracking distribution based on the joint probability distribution;
determining a ground truth tracking distribution based on the joint probability distribution, determining the ground truth tracking distribution further comprising integrating the joint probability distribution over the methodology tracking;

determining a Kullback-Leibler Divergence (KLD) score between the methodology tracking distribution and the ground truth tracking distribution; and controlling operation of the autonomous vehicle based on the KLD score.

8. The computer implemented method of claim 7, wherein the methodology tracking includes the first tracking methodology and a second tracking methodology and wherein the KLD score includes a first KLD score and a second KLD score, and wherein the method further comprises:

determining the first KLD score for the first tracking methodology;

determining the second KLD score for the second tracking methodology, and comparing the first KLD score and the second KLD score; and based on the comparison, selecting between the first tracking methodology and the second tracking methodology implemented on the autonomous vehicle.

9. The computer implemented method of claim 7, wherein controlling the operation further comprises:

optimizing the methodology by optimizing the KLD score.

10. The computer implemented method of claim 7, wherein determining the association further comprises:

computing a similarity metric between the methodology tracking and the ground truth tracking; and determining the association by comparing the similarity metric with a threshold.

11. The computer implemented method of claim 7, determining the association comprises:

generating an association table that counts a number of times that the methodology tracking matches the ground truth tracking, for each parameter, for each time step, for each actor.

12. The computer implemented method of claim 7, wherein determining the methodology tracking distribution comprises integrating the joint probability distribution over the ground truth tracking.

13. A non-transitory computer-readable medium embodying programmed instructions which, when executed by at least one processor of an autonomous vehicle, cause the at least one processor to perform operations comprising:

receiving sensor data from one or more sensors of the autonomous vehicle;

determining, using a first tracking methodology, methodology tracking based on the sensor data;

receiving ground truth tracking;

determining an association between the methodology tracking and the ground truth tracking;

determining a joint probability distribution of the methodology tracking and the ground truth tracking;

determining a methodology tracking distribution based on the joint probability distribution;

determining a ground truth tracking distribution based on the joint probability distribution;

determining a Kullback-Leibler Divergence (KLD) score between the methodology tracking distribution and the ground truth tracking distribution;

controlling operation of the autonomous vehicle based on the KLD score;

determining a first KLD score for the first tracking methodology;

determining a second KLD score for a second tracking methodology;

comparing the first KLD score and the second KLD score; and based on the comparison, selecting between the first tracking methodology and the second tracking methodology implemented on the autonomous vehicle.

14. The non-transitory computer-readable medium of claim 13, wherein the programmed instructions cause the at least one processor to perform operations comprising:

optimizing the methodology by optimizing the KLD score.

15. The non-transitory computer-readable medium of claim 13, wherein determining the association further comprises:

computing a similarity metric between the methodology tracking and the ground truth tracking; and determining the association by comparing the similarity metric with a threshold.

16. The non-transitory computer-readable medium of claim 13, determining the association comprises:

generating an association table that counts a number of times that the methodology tracking matches the ground truth tracking, for each parameter, for each time step, for each actor.

17. The non-transitory computer-readable medium of claim 13, wherein determining the methodology tracking distribution comprises integrating the joint probability distribution over the ground truth tracking.

18. The non-transitory computer-readable medium of claim 13, wherein:

determining the ground truth tracking distribution further comprises integrating the joint probability distribution over the methodology tracking.

* * * * *